United States Patent [19]

Rapp et al.

[11] 4,340,575

[45] Jul. 20, 1982

[54] MANUFACTURE OF HYDROXYLAMMONIUM SALTS

[75] Inventors: Guenther Rapp; Kurt Jockers, both of Ludwigshafen; Erwin Thomas, Freinsheim, all of Fed. Rep. of Germany

[73] Assignee: BASF Aktiengesellschaft, Fed. Rep. of Germany

[21] Appl. No.: 942,658

[22] Filed: Sep. 15, 1978

[30] Foreign Application Priority Data

Sep. 27, 1977 [DE] Fed. Rep. of Germany ....... 2743297

[51] Int. Cl.³ ............................................. C01B 21/20
[52] U.S. Cl. ................................. 423/387; 75/128 W
[58] Field of Search ...................... 423/387; 75/128 W

[56] References Cited

U.S. PATENT DOCUMENTS 2,115,732  5/1938  Krivobok ...................... 75/128 W
3,929,473  12/1975  Streicher ......................... 75/128 W

FOREIGN PATENT DOCUMENTS 712467  7/1954  United Kingdom ................ 423/387

OTHER PUBLICATIONS

Cartech (Carpenter Technology), Carpenter Steel Division, Carpenter Pyromet N-155.

*Primary Examiner*—O. R. Vertiz
*Assistant Examiner*—Wayne A. Langel
*Attorney, Agent, or Firm*—Keil & Witherspoon

[57] ABSTRACT

Hydroxylammonium salts are manufactured by a process comprising the catalytic reduction of nitric oxide with hydrogen in a dilute aqueous mineral acid in the presence of a suspended platinum catalyst at an elevated temperature, wherein the reaction is carried out in vessels of which the walls consist of conventional copper-free molybdenum-containing austenitic chromium-nickel steels which contain from 16 to 28% by weight of chromium, from 20 to 50% by weight of nickel, from 1 to 4% by weight of molybdenum and at most 0.1% by weight of carbon and which in addition contain an amount of titanium which is at least 5 times the amount of carbon but is not more than 1.0% by weight, or an amount of niobium or tantalum which is at least 8 times the amount of carbon but is not more than 1.5% by weight.

The present invention relates to a process for the manufacture of of hydroxylammonium salts by catalytically reducing nitric oxide with hydrogen in a dilute aqueous mineral acid in the presence of a suspended platinum catalyst at an elevated temperature, using corrosion-resistant materials of construction.

2 Claims, No Drawings

MANUFACTURE OF HYDROXYLAMMONIUM SALTS

In the manufacture of hydroxylammonium salts by catalytically reducing nitric oxide with hydrogen in a dilute aqueous mineral acid in the presence of a suspended platinum catalyst at an elevated temperature, the selection of the materials of construction used for the equipment presents a problem inasmuch as the reaction mixture is extremely corrosive. Plastics, eg. polyvinyl chloride, polyethylene, polypropylene and polytetrafluoroethylene, and synthetic and natural rubbers, have proved suitable. Another category of suitable materials of construction comprises glass, enamels, graphite, platinum and tantalum. The disadvantages of using these materials for constructing the reactor are on the one hand their high cost and the difficulty of processing the materials, and on the other hand unsatisfactory properties such as fragility, embrittlement on aging, sensitivity to impact and shock, and low mechanical strength. These properties make it particularly difficult to construct reactors for the manufacture of hydroxylammonium salts if the synthesis is to be carried out under pressure.

A number of commercial steel alloys of high mechanical strength and good corrosion resistance have also proved unsatisfactory for use in conjunction with the synthesis of hydroxylamine by catalytically reducing nitric oxide in an aqueous mineral acid. Chromium-nickel steels, for example material 1.4541, undergo very severe corrosion. Other chromium-nickel steels, with added molybdenum and added copper, for example steel 1.4505, are, it is true, resistant to dilute acids under normal conditions, but corrosion also reduces the life of these steels. However, a particular disadvantage is the adverse effect, on the course of the reaction, of the constituents of the metal alloys which pass into solution.

It is an object of the present invention to provide materials of construction of use in conjunction with the synthesis of hydroxylamine, which are virtually non-corroding, are readily processable, are insensitive to impact and shock, are resistant to aging, are relatively inexpensive and in addition possess high mechanical strength so that the reaction can also be carried out under superatmospheric pressure.

We have found that this object is achieved by providing a process for the manufacture of hydroxylammonium salts which comprises the catalytic reduction of nitric oxide with hydrogen in a dilute aqueous mineral acid in the presence of a suspended platinum catalyst at an elevated temperature, wherein the reaction is carried out in vessels of which the walls consist of conventional copper-free austenitic chromium-nickel steels which contain from 16 to 28% by weight of chromium, from 20 to 50% by weight of nickel, from 1 to 4% by weight of molybdenum and at most 0.1% by weight of carbon and which in addition contain an amount of titanium which is at least 5 times the amount of carbon but is not more than 1.0% by weight, or an amount of niobium or tantalum which is at least 8 times the amount of carbon but is not more than 1.5% by weight.

The process of the invention has the advantage that the materials used possess excellent resistance to corrosion by the reaction medium and do not release any materials detrimental to the course of the reaction into the said medium. Furthermore, the materials used are insensitive to aging, impact and shock and have excellent mechanical strength, good processability and a long life.

The starting material for the synthesis of hydroxylamine is as a rule a mixture of hydrogen and nitric oxide in which the molar ratio of hydrogen to nitric oxide is greater than 1, preferably from 1.5:1 to 6:1. Particularly good results are obtained by maintaining a molar ratio of hydrogen to nitric oxide of 3.5:1 to 5:1 in the reaction zone.

In general, the mineral acid used is a non-reducing strong mineral acid, eg. perchloric acid, nitric acid, sulfuric acid or phosphoric acid. Acid salts of these, eg. ammonium bisulfate, may also be used. The use of sulfuric acid is particularly preferred. As a rule, the aqueous acid is initially from 4 N to 6 N and is not allowed to fall below 0.2 N in the course of the reaction.

The reaction is preferably carried out at from 30° to 80° C., more particularly at from 40° to 60° C. As a rule, the reaction is carried out under atmospheric pressure or superatmospheric pressure, eg. at up to 300 bar.

The platinum catalyst used is in general a supported catalyst. Platinum on a carbon carrier, especially on graphite, has proved particularly suitable. The catalyst is employed in a finely divided form, as a suspension. Preferably, the catalyst contains from 0.2 to 5% by weight of platinum. Advantageously, it additionally contains one or more elements of main groups 5 and/or 6 of the periodic table, having an atomic weight of >31, as well as lead and/or mercury as a catalyst poison. Suitable catalysts and their manufacture are described, for example, in German Published Application DAS 1,088,037 and in German Pat. Nos. 920,963, 956,038 and 945,752.

The characteristic feature of the process is that the reaction is carried out in vessels of which the walls consist of conventional copper-free austenitic chromium-nickel steels which contain from 16 to 28% by weight of chromium, from 20 to 50% by weight of nickel, from 1 to 4% by weight of molybdenum and at most 0.1% by weight of carbon, and which in addition contain an amount of titanium which is at least 5 times the amount of carbon but is not more than 1.0% by weight, or an amount of niobium or tantalum which is at least 8 times the amount of carbon but is not more than 1.5% by weight. Copper-free means that copper has not been added as an alloying metal. This, however, does not exclude the presence of natural amounts of copper, such amounts being inevitably introduced if the steel is manufactured from scrap iron. In addition, the presence, in the materials of construction, of other elements usually encountered in steels, for example manganese or silicon, is not excluded. A chromium-nickel steel containing about 25% by weight of chromium, 25% by weight of nickel, 2.25% by weight of molybdenum, 0.04% by weight of carbon and 0.5% by weight of titanium, has proved to be particularly suitable. The remainder is of course in each case iron.

The term reaction vessel is to be interpreted in its broadest sense. It not only encompasses the walls of the actual vessel but also the accessory pipelines, pumps, condensers and stirrers, ie. all walls which come into contact with the reaction mixture should consist of the material according to the invention. The steel alloys according to the invention possess all the advantages of austenitic alloy steels for equipment construction, eg. they can be cast and shaped, are easily processable and can be welded, in each case using conventional techniques. Their high mechanical strength permits their use as a material for high-pressure reactors. Their decisive advantage, in addition to their attractive price, is their high resistance to corrosion by the reducing strongly acid aqueous reaction medium. It is surprising that the synthesis of hydroxylamine proves trouble-free after the walls of the vessel have been exposed to attack by the reaction medium, under the reaction conditions, for about 200 hours. The passivation thus achieved has not been achievable hitherto by other passivating agents.

Hydroxylammonium salts are used for the manufacture of cyclohexanone-oxime, a caprolactam intermediate.

The Examples which follow illustrate the invention.

EXAMPLE 1

Four stirred reactors provided with cooling equipment and constructed of material No. 1.4577, comprising 25% of Ni, 25% of Cr, 2.25% of Mo, 0.04% of C and varying amounts of titanium from 0.22 to 0.58%, the remainder being Fe and natural impurities, are connected so as to communicate with one another.

These four vessels connected in series are each filled with 6,000 liters of 4.5 N sulfuric acid and 150 kg of a platinum-graphite catalyst containing 1% by weight of platinum. With the connecting lines closed the contents of the reaction vessels are exposed to a hydrogen/nitric oxide mixture, in the molar ratio of 1.7:1, so as to result in the following concentration of free sulfuric acid in the individual reaction vessels.

| Reactor 1 | 3.2 N |
|---|---|
| Reactor 2 | 2.0 N |
| Reactor 3 | 0.95 N |
| Reactor 4 | 0.3 N |

The connecting lines between the individual reaction vessels are now opened and 20% strength by weight sulfuric acid together with platinum catalyst is introduced into reactor 1 and passed through the reactors to a separating unit. The catalyst separated from the hydroxylammonium sulfate solution formed is returned to reaction vessel 1. At the same time, a mixture of hydrogen and nitric oxide of the above composition is passed in parallel through reactors 4, 3 and 2. The off-gases from these reactors are collected and are conjointly passed through reactor 1. This gives 380 kg/h of hydroxylamine in the form of a hydroxylammonium sulfate solution, the yield of hydroxylamine being 93.5% based on nitric oxide converted.

After continuous operation for 17 years, all parts of the reactor, ie. whether fabricated from sheet or made from castings consisting of the steel stabilized by the inclusion of an amount of titanium equal to from 5 to 8 times the amount of carbon in the steel, exhibit intercrystalline corrosion only in the heat-exposed zones of welds. Steel components stabilized with titanium in an amount greater than 10 times the carbon content of the steel exhibit no defects whatsoever.

After the end of the passivation stage, no effect of the materials of construction on the hydroxylamine synthesis could be observed.

EXAMPLE 2 AND COMPARATIVE EXAMPLES 1 TO 3

Samples of various types of stainless steel are introduced into the first reaction vessel and exposed to the reaction medium for 8 months. After withdrawing the samples, their annual surface wear is calculated from the length of exposure and the weight loss, taking into account the exposed surface and the density. The results are shown in the Table which follows.

TABLE

| Material | Material No. | C | Cr | Ni | Mo | Cu | Ti | Nb | Yearly wear (mm) |
|---|---|---|---|---|---|---|---|---|---|
| Comparative Example 1 | 1.4541 | 0.07 | 18 | 10.5 | — | — | 0.45 | — | almost dissolved |
| Comparative Example 2 | 1.4571 | 0.06 | 17.5 | 12 | 2.25 | — | 0.47 | — | 0.12 |
| Comparative Example 3 | 1.4505 | 0.05 | 18 | 20 | 2.25 | 2.0 | — | 0.63 | 0.47 |
| Example 2 | 1.4577 | 0.04 | 25 | 25 | 2.25 | — | 0.52 | — | 0.03 |

COMPARATIVE EXAMPLE 4

By way of comparison, the second reactor consisting of material No. 1.4577, was provided with inserts of material No. 1.4571 which contains 12% of Ni, 17.5% of Cr, 2.25% of Mo, 0.06% of C and 0.47% of Ti, the surface of these inserts amounting to 2.5% of the total exposed material surface in this reactor. Under the reaction conditions described in Example 1, little wear was externally detectable on material No. 1.4571 after 14 months' continuous operation with a sulfuric acid concentration of from 1.9 to 2.1 N, but in the synthesis of hydroxylamine the yield of hydroxylamine fell by 4.5% and the yield of undesired by-product rose by 70%.

EXAMPLE 3

200 g of a platinum-graphite catalyst containing 0.5% by weight of platinum are suspended in 5 liters of 4.1 N sulfuric acid in a pressure vessel equipped with a stirrer and constructed from material 1.4577, comprising 25% of Ni, 25% of Cr, 2.25% of Mo, 0.03% of C, 0.4% of Ti, remainder Fe. A measured amount of NO and $H_2$ in the volume ratio 37:63 under a pressure of 9 bar is passed, whilst stirring, into the reactor, which is kept at 40° C. by cooling. Unconverted gases, which escape via a pressure-regulating valve, are measured and analyzed. When the sulfuric acid concentration has fallen to about 0.4 N, the reaction is terminated, the pressure is let down, the hydroxylamine solution is separated from the catalyst and the amount of hydroxylamine formed is determined. The yield of hydroxylamine is 91.5%, based on NO converted. After 29 trial batches under pressure, following upon about 100 batches carried out at atmospheric pressure, the material of construction shows no corrosion. The batches at atmospheric pressure were carried out in order to passivate the material.

COMPARATIVE EXAMPLE 5

The procedure described for Example 3 is followed using, by way of comparison, a reactor constructed from Hastelloy$^{(R)}$ B2 containing 71.0% of nickel and 28.4% of molybdenum; under the reaction conditions described, and also when operating under atmospheric pressure, virtually no hydroxylamine forms. The material exhibits distinct signs of corrosion after 5 trial batches.

We claim:

1. A process for the manufacture of hydroxylammonium salts comprising the catalytic reduction of nitric oxide with hydrogen in a dilute aqueous mineral acid in the presence of a suspended platinum catalyst at an elevated temperature, wherein the reaction is carried out in vessels of which the walls consist of conventional copper-free molybdenum-containing austenitic chromium-nickel steels which, in addition to iron, consist essentially of from 16 to 28% by weight of chromium, from 20 to 50% by weight of nickel, from 1 to 4% by weight of molybdenum and at most 0.1% by weight of carbon and which in addition contain an amount of titanium which is at least 5 times the amount of carbon but is not more than 1.0% by weight, or an amount of niobium or tantalum which is at least 8 times the amount of carbon but is not more than 1.5% by weight.

2. The process of claim 1 wherein the chromium-nickel steel contains about 25 percent by weight of chromium, 25 percent by weight of nickel, 2.25 percent by weight of molybdenum, 0.04 percent by weight of carbon and 0.5 percent by weight of titanium.

* * * * *